United States Patent
Homma et al.

(10) Patent No.: US 9,392,806 B2
(45) Date of Patent: *Jul. 19, 2016

(54) OIL/FAT COMPOSITION COMPRISING α-LINOLENIC ACID

(71) Applicant: Kao Corporation, Chuo-ku (JP)

(72) Inventors: Rika Homma, Sunderland, MA (US); Yuumi Matsuda, Sumida-ku (JP)

(73) Assignee: KAO CORPORATION, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/347,888

(22) PCT Filed: Oct. 5, 2012

(86) PCT No.: PCT/JP2012/076000
§ 371 (c)(1),
(2) Date: Mar. 27, 2014

(87) PCT Pub. No.: WO2013/051705
PCT Pub. Date: Apr. 11, 2013

(65) Prior Publication Data
US 2014/0234520 A1   Aug. 21, 2014

(30) Foreign Application Priority Data

Oct. 7, 2011   (JP) .................. 2011-223122
Dec. 14, 2011  (JP) .................. 2011-273446

(51) Int. Cl.
*A23D 7/005* (2006.01)
*A23D 9/007* (2006.01)
*A23D 9/013* (2006.01)

(52) U.S. Cl.
CPC .............. *A23D 7/0053* (2013.01); *A23D 9/007* (2013.01); *A23D 9/013* (2013.01)

(58) Field of Classification Search
None
See application file for complete search history.

(56) References Cited

U.S. PATENT DOCUMENTS

| | | |
|---|---|---|
| 2002/0009481 A1 | 1/2002 | Nadachi et al. |
| 2004/0062847 A1 | 4/2004 | Koike et al. |
| 2004/0265466 A1 | 12/2004 | Takase et al. |
| 2008/0069932 A1 | 3/2008 | Kohori et al. |
| 2011/0177226 A1 | 7/2011 | Nii et al. |
| 2012/0259133 A1 | 10/2012 | Homma et al. |
| 2013/0023684 A1 | 1/2013 | Moriwaki et al. |
| 2013/0230630 A1 | 9/2013 | Homma et al. |
| 2013/0280407 A1 | 10/2013 | Homma et al. |

FOREIGN PATENT DOCUMENTS

| | | |
|---|---|---|
| CN | 1468060 A | 1/2004 |
| CN | 1582116 A | 2/2005 |
| CN | 1949983 A | 4/2007 |
| CN | 102150857 A | 8/2011 |
| JP | 61-118318 A | 6/1986 |
| JP | 05 42411 | 6/1993 |
| JP | 10 231495 | 9/1998 |
| JP | 2001 226693 | 8/2001 |
| JP | 2003 160794 | 6/2003 |
| JP | 3597437 | 9/2004 |
| JP | 2006 257064 | 9/2006 |
| JP | 2011 115112 | 6/2011 |

OTHER PUBLICATIONS

Rose, W. et al. 1941. Oil and Soap, Aug. 1941, p. 173.*
Painter, E. et al. 1943. Oil and Soap, Oct. 1943, p. 208.*
Itoh, T. et al. 1973. JAOCS 50:300.*
Itoh, T. et al. 1973. JAOCS 50:122.*
U.S. Appl. No. 14/350,955, filed Apr. 10, 2014, Homma.
U.S. Appl. No. 14/240,214, filed Feb. 21, 2014, Homma, et al.
U.S. Appl. No. 14/347,915, filed Mar. 27, 2014, Homma, et al.
U.S. Appl. No. 14/240,295, filed Feb. 21, 2014, Homma, et al.
U.S. Appl. No. 14/240,206, filed Feb. 21, 2014, Homma, et al.
U.S. Appl. No. 14/240,248, filed Feb. 21, 2014, Homma, et al.
U.S. Appl. No. 14/240,209, filed Feb. 21, 2014, Homma, et al.
U.S. Appl. No. 14/379,670, filed Aug. 19, 2014, Matsuda.
U.S. Appl. No. 14/385,901, filed Sep. 17, 2014, Matsuda.
Celso Paoletti. et al., "Lipid Composition of Azolla Caroliniana Biomass and its Seasonal Variation" Phytochemistry, vol. 26, No. 4, 1987, pp. 1045-1047 and Cover Pages.
Extended European Search Report issued May 4, 2015 in Patent Application No. 12838788.3.
Alfonso Ranalli, et al., "Comparative evaluation of the olive oil given by a new processing system" International Journal of Food Science and Technology, vol. 32, XP002381415, Jan. 1997, pp. 289-297.
International Search Report Issued Dec. 18, 2012 in PCT/JP12/076000 Filed Oct. 5, 2012.

* cited by examiner

Primary Examiner — Nikki H Dees
(74) Attorney, Agent, or Firm — Oblon, McClelland, Maier & Neustadt, L.L.P

(57) ABSTRACT

Provided is a fat or oil composition that may reduce degradation odor to a less extent at the time of cooking even though comprising α-linolenic acid in a large amount, and is capable of improving the taste and flavor of the cooked food. The fat or oil composition comprises the following components (A) and (B): (A) a fat or oil whose constituent fatty acids comprise from 10 to 50 mass % of α-linolenic acid; and (B) 0.05 to 1.8 mass % of a free type triterpene alcohol.

21 Claims, No Drawings

OIL/FAT COMPOSITION COMPRISING α-LINOLENIC ACID

FIELD OF THE INVENTION

The present invention relates to a fat or oil composition useful in cooking.

BACKGROUND OF THE INVENTION

Many studies have been made on the functions of fatty acids in fats or oils in response to increasing health consciousness in recent years. For example, it has been reported that fish oil, linseed oil, Japanese basil oil, and the like, which are rich in α-linolenic acid, eicosapentaenoic acid (EPA), and docosahexaenoic acid (DHA), which are ω3 highly-unsaturated fatty acids, tend to reduce visceral fat amounts (Patent Document 1).

Further, α-linolenic acid is converted into eicosapentaenoic acid or docosahexaenoic acid in a human body, which has a high physiological activity, and hence the use of a fat or oil containing α-linolenic acid is desired.

However, the fat or oil rich in α-linolenic acid is low in thermal stability and oxidative stability, thus being easily degraded, and hence the practical use thereof is remarkably restricted from the viewpoint of taste and flavor.

CITATION LIST

Patent Document

[Patent Document 1] JP-A-10-231495

SUMMARY OF THE INVENTION

The present invention provides a fat or oil composition, comprising the following components (A) and (B):

(A) a fat or oil whose constituent fatty acids comprise from 10 to 50 mass % of α-linolenic acid; and (B) 0.05 to 1.8 mass % of a free type triterpene alcohol.

DETAILED DESCRIPTION OF THE INVENTION

In particular, when a fat or oil rich in α-linolenic acid is used for cooking, uncomfortable degradation odor may be caused, and the cooked food may provide oily heavy taste and flavor.

Thus, the present invention relates to providing a fat or oil composition that may reduce degradation odor to a less extent at the time of cooking even though containing α-linolenic acid in a large amount, and is capable of improving the taste and flavor of the cooked food.

The inventors of the present invention made intensive studies to solve the above-mentioned problems. As a result, the inventors found that when a fat or oil comprises a free type triterpene alcohol in a specific amount, the degradation odor at the time of cooking is improved, the original good taste and flavor of a material to be fried is felt, and oily feeling disappears, and thus a fat or oil composition having good capabilities to be used as a fat or oil for cooking can be obtained.

According to the present invention, it is possible to obtain a fat or oil composition that may reduce the degradation odor to a less extent at the time of cooking even though containing α-linolenic acid in a large amount, and is capable of providing a delicious cooked food excellent in taste and flavor.

The content of the fat or oil as the component (A) according to the present invention is preferably from 95 to 99.95 mass % (hereinafter simply referred to as "%"), more preferably from 97 to 99%, in the fat or oil composition from the standpoint of the use thereof.

In the constituent fatty acids of the fat or oil (A) to be used in the present invention, the content of α-linolenic acid is from 10 to 50%, and is preferably 15% or more, more preferably 20% or more, more preferably 25% or more, even more preferably 30% or more, from the standpoint of physiological effects. Further, the content of α-linolenic acid is preferably 40% or less, more preferably 35% or less, more preferably 30% or less, even more preferably 25% or less, and is preferably from 10 to 40%, more preferably from 10 to 35%, more preferably from 10 to 30%, more preferably from 15 to 30%, even more preferably from 18 to 25%, from the standpoint of providing rich body. Note that the amount of a fatty acid herein refers to an amount obtained by converting it to a free fatty acid.

The constituent fatty acids of the fat or oil (A) other than α-linolenic acid are not particularly limited, and may be any of saturated fatty acids and unsaturated fatty acids. The ratio of the unsaturated fatty acids is preferably from 60 to 100%, more preferably from 70 to 100%, more preferably from 75 to 100%, even more preferably from 80 to 98%, from the standpoints of the appearance and industrial productivity of the fat or oil. The carbon number of the unsaturated fatty acids is preferably from 14 to 24, more preferably from 16 to 22, from the standpoint of physiological effects.

In the constituent fatty acids of the fat or oil (A), the content mass ratio of α-linolenic acid (C18:3) to oleic acid (C18:1), [(C18:3)/(C18:1)], is preferably 0.1 or more, more preferably 0.2 or more, even more preferably 0.3 or more, and is preferably 2 or less, more preferably 1.5 or less, more preferably 1.2 or less, even more preferably 1.1 or less. Specifically, the content mass ratio is preferably from 0.1 to 2, more preferably from 0.1 to 1.5, more preferably from 0.2 to 1.2, even more preferably from 0.3 to 1.1, from the standpoint of improving the texture of food.

Further, the content of linoleic acid (C18:2) in the constituent fatty acids of the fat or oil (A) is preferably 80% or less, more preferably 60% or less, more preferably 45% or less, even more preferably 30% or less, from the standpoint of oxidative stability.

In addition, the content of the saturated fatty acids in the constituent fatty acids of the fat or oil (A) is preferably 40% or less, more preferably from 0 to 30%, more preferably from 0 to 25%, even more preferably from 2 to 20%, from the standpoints of the appearance, the physiological effects, and the industrial productivity of the fat or oil. The carbon numbers of the saturated fatty acids are preferably from 14 to 24, more preferably from 16 to 22.

Besides, the total content of saturated fatty acids having 6 to 12 carbon atoms in the constituent fatty acids of the fat or oil (A) is preferably less than 40%, more preferably less than 30%, even more preferably less than 20%, from the standpoint of suppressing smoke generation at the time of cooking.

The fat or oil (A) in the present invention contains any one or more of a monoacylglycerol, a diacylglycerol, and a triacylglycerol.

The content of the triacylglycerol in the fat or oil (A) is preferably 78% or more, more preferably 88% or more, more preferably 90% or more, even more preferably 92% or more, and is preferably 100% or less, more preferably 99.5% or less, even more preferably 99% or less. Specifically, the content is preferably from 78 to 100%, more preferably from 88 to 100%, more preferably from 90 to 99.5%, even more preferably from 92 to 99%, from the standpoint of the industrial productivity of the fat or oil.

Besides, the content of the diacylglycerol is preferably 19% or less, more preferably 9% or less, more preferably 7% or less, even more preferably 5% or less, and is preferably 0.1% or more, more preferably 0.2% or more. Specifically, the content is preferably from 0.1 to 7%, more preferably from 0.2 to 5%, from the standpoint of the industrial productivity of the fat or oil. Moreover, the content of the monoacylglycerol is preferably 3% or less, more preferably from 0 to 2%, from the standpoint of improving the taste and flavor.

In addition, the content of a free fatty acid or a salt thereof contained in the fat or oil (A) is preferably 5% or less, more preferably from 0 to 2%, even more preferably from 0 to 1%, from the standpoints of the taste and flavor and the industrial productivity of the fat or oil.

An edible fat or oil that may be used as an origin of the fat or oil (A) according to the present invention is not particularly limited, and examples thereof may include the following fats or oils: plant-derived fats or oils such as soybean oil, rapeseed oil, safflower oil, rice oil, corn oil, palm oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm olein, palm stearin, coconut oil, palm kernel oil, cacao fat, sal fat, shea fat, and algae oil; animal-derived fats or oils such as fish oil, lard, beef tallow, and butter fat; and transesterified oils, hydrogenated oils, and fractionated oils thereof. The oils may each be used singly or may be mixed appropriately before use. Of those, from the standpoint of usability, a plant-derived fat or oil is preferably used, a liquid fat or oil excellent in low-temperature resistance is more preferably used, and Japanese basil oil, linseed oil, or perilla oil rich in α-linolenic acid is even more preferably used. Note that the liquid fat or oil means a fat or oil that is in a liquid state at 20° C., when determined in accordance with a cold test described in Standard Methods for Analysis of Fats, Oils and Related Materials 2.3.8-27. In addition, the edible fat or oil is preferably a refined fat or oil obtained by a refinement step.

The term "triterpene alcohol" as used herein refers to a tetracyclic triterpene alcohol having 30 or 31 carbon atoms.

The triterpene alcohol can be obtained by, for example, extraction from rice, rice bran, a fat or oil containing the triterpene alcohol such as rice oil, or a fat or oil-processed product, or by hydrolysis of γ-oryzanol. Further, a commercially available product may be used.

The term "γ-oryzanol" as used herein is a collective term for a ferulic acid (3-methoxy-4-hydroxycinnamic acid) ester of a sterol, and the γ-oryzanol is a substance present in rice oil, corn oil, or another cereal bran oil. Here, examples of the sterol include the triterpene alcohol, and phytosterols other than the triterpene alcohol, such as α-sitosterol, β-sitosterol, stigmasterol, campesterol, α-sitostanol, β-sitostanol, stigmastanol, campestanol, brassicasterol, fucosterol, isofucosterol, spinasterol, and avenasterol and the like. The γ-oryzanol can be measured in accordance with the method described in J. Food Science, 65(8), 1395 (2000) or Lipids, 30(3), 269 (1995).

The triterpene alcohols are classified into the free type triterpene alcohol used as the component (B) in the present invention, a fatty acid ester type triterpene alcohol, and a ferulic acid ester type triterpene alcohol.

The term "free type triterpene alcohol" refers to a triterpene alcohol having a hydroxyl group at C-3 position of a steroid nucleus.

Examples of the free type triterpene alcohol (B) include cycloartenol, 24-methylenecycloartanol, cyclobranol, cycloartanol, cyclosadol, cyclolaudenol, butyrospermol, and parkeol and the like. The free type triterpene alcohol may be used as a single compound or a mixture of the compounds. Of those, one or two or more selected from cycloartenol, 24-methylenecycloartanol, and cyclobranol are preferably used, and cycloartenol, 24-methylenecycloartanol, or a combination thereof is more preferably used. The free type triterpene alcohol can be measured in accordance with the method described in J. Am. Oil Chem. Soc., 82 (6), 439 (2005).

The fat or oil composition according to the present invention contains from 0.05 to 1.8% of the free type triterpene alcohol (B). By controlling the content of the component (B) within the specified range, degradation odor smelled at the time of cooking can be suppressed, and the cooked food can have good taste and flavor. That is, the free type triterpene alcohol (B) can be used for suppressing the degradation odor at the time of using, for cooking, the fat or oil whose constituent fatty acids comprise α-linolenic acid in the predetermined content.

The content of the free type triterpene alcohol (B) in the fat or oil composition is preferably 0.05% or more, more preferably 0.1% or more, and is preferably 1.8% or less, more preferably 1.5% or less, more preferably 1.2% or less, more preferably 1% or less, even more preferably 0.75% or less. Specifically, the content is preferably from 0.05 to 1.5%, more preferably from 0.05 to 1.2%, more preferably from 0.05 to 1%, more preferably from 0.1 to 1%, even more preferably from 0.1 to 0.75%, from the standpoints of suppressing the degradation odor at the time of cooking and improving the taste and flavor.

Further, the content of cycloartenol in the free type triterpene alcohol is preferably from 15 to 100%, more preferably from 20 to 90%, even more preferably from 25 to 80%, from the same standpoints as above.

In the fat or oil composition according to the present invention, the mass ratio between the content, in the fat or oil composition, of α-linolenic acid (C18:3) in the constituent fatty acids of the fat or oil (A) and the content, in the fat or oil composition, of the free type triterpene alcohol (B), [(C18:3)/(B)], is preferably 8 or more, more preferably 10 or more, more preferably 15 or more, more preferably 20 or more, even more preferably 30 or more, and is preferably 500 or less, more preferably 400 or less, more preferably 350 or less, more preferably 300 or less, even more preferably 250 or less. Specifically, the mass ratio [(C18:3)/(B)] is preferably from 8 to 500, more preferably from 10 to 500, more preferably from 15 to 400, more preferably from 20 to 350, more preferably from 30 to 300, even more preferably from 30 to 250, from the standpoints of suppressing the degradation odor at the time of cooking and improving the texture of food.

The term "fatty acid ester type triterpene alcohol" refers to a triterpene alcohol in which a fatty acid is bonded to the hydroxyl group by an ester binding at the C-3 position thereof.

In the fat or oil composition according to the present invention, the content of the fatty acid ester type triterpene alcohol is preferably 1.4% or less, more preferably 0.5% or less, even more preferably 0.4% or less, and is preferably 0.01% or more, more preferably 0.1% or more, even more preferably 0.2% or more. Specifically, the content is preferably from 0.01 to 1.4%, more preferably from 0.01 to 0.5%, more preferably from 0.1 to 0.5%, even more preferably from 0.2 to 0.4%, from the standpoint of improving the texture of food and the taste and flavor of a cooked food. Any fatty acid can be used without particular limitation as long as it forms an ester with the free type triterpene alcohol, and there are given linear or branched and saturated or unsaturated fatty acids as examples thereof.

The fatty acid ester type triterpene alcohol can be measured in accordance with the method described in J. Food Science, 65(8), 1395 (2000).

Further, the amount of the fatty acid ester type triterpene alcohol can be calculated on the basis of the amount of the total triterpene alcohols, the amount of the free type triterpene alcohol, and the amount of the ferulic acid ester type triterpene alcohol. Note that the amount of the total triterpene alcohols can be measured in accordance with the method described in J. Am. Oil Chem. Soc., 82 (6), 439 (2005).

The term "ferulic acid ester type triterpene alcohol" refers to a triterpene alcohol in which ferulic acid is bonded to the hydroxyl group by an ester binding at the C-3 position thereof.

In the fat or oil composition according to the present invention, the content of the ferulic acid ester type triterpene alcohol is preferably 0.7% or less, more preferably 0.5% or less, more preferably 0.15% or less, more preferably 0.1% or less, even more preferably 0.05% or less, and is preferably 0% or more, more preferably 0.0002% or more, even more preferably 0.001% or more. Specifically, the content is preferably from 0 to 0.5%, more preferably from 0.0002 to 0.15%, more preferably from 0.0002 to 0.1%, more preferably from 0.001 to 0.1%, even more preferably from 0.001 to 0.05%, from the standpoints of improving the taste and flavor and suppressing the oily feeling.

The ferulic acid ester type triterpene alcohol can be measured in accordance with the method described in J. Food Science, 65(8), 1395 (2000) or Lipids, 30(3), 269 (1995).

In addition, the content of an antioxidant in the fat or oil composition according to the present invention is preferably from 0.01 to 2%, more preferably from 0.01 to 1%, even more preferably from 0.01 to 0.5%, from the standpoint of oxidative stability at the time of each of preservation and cooking. The antioxidant includes preferably one or two or more selected from, for example, a natural antioxidant, tocopherol, ascorbyl palmitate, ascorbyl stearate, dibutylhydroxytoluene (BHT), and butylated hydroxyanisole (BHA), more preferably, for example, one or two or more selected from a natural antioxidant, tocopherol, and ascorbyl palmitate. Of those, ascorbyl palmitate and tocopherol are preferably used in combination.

The fat or oil composition according to the present invention can be obtained by, for example, adding the component (B) and other components, if necessary, to the fat or oil (A) and optionally heating and stirring the mixture, or the like.

Such fat or oil composition can be used in the same manner as a general edible fat or oil, and can be widely applied to a variety of foods and beverages including the fat or oil. In particular, the fat or oil composition is used suitably as a fat or oil for cooking, more suitably as a fat or oil for cooking of a deep-fried food such as fry or tempura, a saute, or a grilled food.

In relation to the above-mentioned embodiment, the present invention discloses the following fat or oil compositions or use.

<1> A fat or oil composition, comprising the following components (A) and (B):

(A) a fat or oil whose constituent fatty acids comprise from 10 to 50 mass % of α-linolenic acid; and (B) 0.05 to 1.8 mass % of a free type triterpene alcohol.

<2> The fat or oil composition according to the above-mentioned item <1>, in which the content of α-linolenic acid in the constituent fatty acids of the fat or oil as the component (A) is preferably 15 mass % or more, more preferably 20 mass % or more, more preferably 25 mass % or more, even more preferably 30 mass % or more.

<3> The fat or oil composition according to the above-mentioned item <1> or <2>, in which the content of α-linolenic acid in the constituent fatty acids of the fat or oil as the component (A) is preferably 40 mass % or less, more preferably 35 mass % or less, more preferably 30 mass % or less, even more preferably 25 mass % or less.

<4> The fat or oil composition according to the above-mentioned item <1>, in which the content of α-linolenic acid in the constituent fatty acids of the fat or oil as the component (A) is preferably from 10 to 40 mass %, more preferably from 10 to 35 mass %, more preferably from 10 to 30 mass %, more preferably from 15 to 30 mass %, even more preferably from 18 to 25 mass %.

<5> The fat or oil composition according to any one of the above-mentioned items <1> to <4>, in which unsaturated fatty acids are comprised in a content of from 60 to 100 mass %, preferably from 70 to 100 mass %, more preferably from 75 to 100 mass %, even more preferably from 80 to 98 mass % relative to the constituent fatty acids of the fat or oil as the component (A) other than α-linolenic acid.

<6> The fat or oil composition according to any one of the above-mentioned items <1> to <5>, in which the content mass ratio of α-linolenic acid (C18:3) to oleic acid (C18:1), [(C18:3)/(C18:1)], in the constituent fatty acids of the fat or oil as the component (A) is 0.1 or more, preferably 0.2 or more, more preferably 0.3 or more, is 2 or less, preferably 1.5 or less, more preferably 1.2 or less, more preferably 1.1 or less, and is more preferably from 0.1 to 2, more preferably from 0.1 to 1.5, more preferably from 0.2 to 1.2, even more preferably from 0.3 to 1.1.

<7> The fat or oil composition according to any one of the above-mentioned items <1> to <6>, in which the content of linoleic acid (C18:2) in the constituent fatty acids of the fat or oil as the component (A) is 80 mass % or less, preferably 60 mass % or less, more preferably 45 mass % or less, even more preferably 30 mass % or less.

<8> The fat or oil composition according to any one of the above-mentioned items <1> to <7>, in which the content of saturated fatty acids in the constituent fatty acids of the fat or oil as the component (A) is 40 mass % or less, preferably from 0 to 30 mass %, more preferably from 0 to 25 mass %, even more preferably from 2 to 20 mass %.

<9> The fat or oil composition according to any one of the above-mentioned items <1> to <8>, in which the total content of saturated fatty acids having 6 to 12 carbon atoms, in the constituent fatty acids of the fat or oil as the component (A), is less than 40 mass %, preferably less than 30 mass %, more preferably less than 20 mass %.

<10> The fat or oil composition according to any one of the above-mentioned items <1> to <9>, in which the content of a triacylglycerol in the fat or oil as the component (A) is 78 mass % or more, preferably 88 mass % or more, more preferably 90 mass % or more, even more preferably 92 mass % or more, is 100 mass % or less, preferably 99.5 mass % or less, more preferably 99 mass % or less, and is preferably from 78 to 100 mass %, more preferably from 88 to 100 mass %, more preferably from 90 to 99.5 mass %, even more preferably from 92 to 99 mass %.

<11> The fat or oil composition according to any one of the above-mentioned items <1> to <10>, in which the content of the free type triterpene alcohol as the component (B) is 0.05 mass % or more, preferably 0.1 mass % or more, is 1.5 mass % or less, preferably 1.2 mass % or less, more preferably 1 mass % or less, even more preferably 0.75 mass % or less, and is preferably from 0.05 to 1.5 mass %, more preferably from 0.05 to 1.2 mass %, more preferably from 0.05 to 1 mass %, more preferably from 0.1 to 1 mass %, even more preferably from 0.1 to 0.75 mass %.

<12> The fat or oil composition according to the above-mentioned item <11>, in which the free type triterpene alcohol as the component (B) comprises one or two or more selected from cycloartenol, 24-methylenecycloartanol, cyclobranol, cycloartanol, cyclosadol, cyclolaudenol, butyrospermol, and parkeol, preferably one or two or more selected from cycloartenol, 24-methylenecycloartanol, and cyclobranol, more preferably cycloartenol, 24-methylenecycloartanol, or a combination thereof.

<13> The fat or oil composition according to the above-mentioned item <12>, in which the content of cycloartenol in the free type triterpene alcohol as the component (B) is from 15 to 100 mass %, preferably from 20 to 90 mass %, more preferably from 25 to 80 mass %.

<14> The fat or oil composition according to any one of the above-mentioned items <1> to <13>, comprising from 95 to 99.95 mass %, preferably from 97 to 99 mass % of the fat or oil as the component (A).

<15> The fat or oil composition according to any one of the above-mentioned items <1> to <14>, in which the mass ratio between the content, in the fat or oil composition, of α-linolenic acid (C18:3) in the constituent fatty acids of the fat or oil as the component (A) and the content, in the fat or oil composition, of the free type triterpene alcohol as the component (B), [(C18:3)/(B)], is 8 or more, preferably 10 or more, more preferably 15 or more, more preferably 20 or more, even more preferably 30 or more, is 500 or less, preferably 400 or less, more preferably 350 or less, more preferably 300 or less, even more preferably 250 or less, and is preferably from 8 to 500, more preferably from 10 to 500, more preferably from 15 to 400, more preferably from 20 to 350, more preferably from 30 to 300, even more preferably from 30 to 250.

<16> The fat or oil composition according to any one of the above-mentioned items <1> to <15>, in which the content of a fatty acid ester type triterpene alcohol in the fat or oil composition is 1.4 mass % or less, preferably 0.5 mass % or less, more preferably 0.4 mass % or less, is 0.01 mass % or more, preferably 0.1 mass % or more, more preferably 0.2 mass % or more, and is preferably from 0.01 to 1.4 mass %, more preferably from 0.01 to 0.5 mass %, more preferably from 0.1 to 0.5 mass %, even more preferably from 0.2 to 0.4 mass %.

<17> The fat or oil composition according to any one of the above-mentioned items <1> to <16>, in which the content of a ferulic acid ester type triterpene alcohol in the fat or oil composition is 0.7 mass % or less, preferably 0.5 mass % or less, more preferably 0.15 mass % or less, more preferably 0.1 mass % or less, even more preferably 0.05 mass % or less, is 0 mass % or more, preferably 0.0002 mass % or more, more preferably 0.001 mass % or more, and is preferably from 0 to 0.5 mass %, more preferably from 0.0002 to 0.15 mass %, more preferably from 0.0002 to 0.1 mass %, more preferably from 0.001 to 0.1 mass %, even more preferably from 0.001 to 0.05 mass %.

<18> The fat or oil composition according to any one of the above-mentioned items <1> to <17>, further comprising from 0.01 to 2 mass %, preferably from 0.01 to 1 mass %, more preferably from 0.01 to 0.5 mass % of an antioxidant.

<19> The fat or oil composition according to the above-mentioned item <18>, in which the antioxidant comprises one or two or more selected from a natural antioxidant, tocopherol, ascorbyl palmitate, ascorbyl stearate, dibutylhydroxytoluene, and butylated hydroxyanisole, preferably one or two or more selected from a natural antioxidant, tocopherol, and ascorbyl palmitate, more preferably a combination of tocopherol and ascorbyl palmitate.

<20> Use of the fat or oil composition according to any one of the above-mentioned items <1> to <19> as an edible fat or oil.

<21> The use according to the above-mentioned item <20> as a fat or oil for cooking.

<22> The use according to the above-mentioned item <20> as a fat or oil for cooking of a deep-fried food, a saute, or a grilled food.

<23> Use of a free type triterpene alcohol for suppressing degradation odor at the time of cooking with a fat or oil whose constituent fatty acids comprise from 10 to 50 mass % of α-linolenic acid.

<24> The use according to the above-mentioned item <23>, in which the content of α-linolenic acid in the constituent fatty acids of the fat or oil is preferably 15 mass % or more, more preferably 20 mass % or more, more preferably 25 mass % or more, even more preferably 30 mass % or more.

<25> The use according to the above-mentioned item <23> or <24>, in which the content of α-linolenic acid in the constituent fatty acids of the fat or oil is preferably 40 mass % or less, more preferably 35 mass % or less, more preferably 30 mass % or less, even more preferably 25 mass % or less.

<26> The use according to any one of the above-mentioned items <23> to <25>, in which the free type triterpene alcohol comprises one or two or more selected from cycloartenol, 24-methylenecycloartanol, cyclobranol, cycloartanol, cyclosadol, cyclolaudenol, butyrospermol, and parkeol, preferably one or two or more selected from cycloartenol, 24-methylenecycloartanol, and cyclobranol, more preferably cycloartenol, 24-methylenecycloartanol, or a combination thereof.

<27> The use according to the above-mentioned item <26>, in which the content of cycloartenol in the free type triterpene alcohol is from 15 to 100 mass %, preferably from 20 to 90 mass %, more preferably from 25 to 80 mass %.

<28> The use according to any one of the above-mentioned items <23> to <27>, in which the fat or oil composition comprising the fat or oil and the free type triterpene alcohol is prepared, so that the mass ratio between the content, in the fat or oil composition, of α-linolenic acid (C18:3) in the constituent fatty acids of the fat or oil and the content, in the fat or oil composition, of the free type triterpene alcohol, [(C18:3)/free type triterpene alcohol], is 8 or more, preferably 10 or more, more preferably 15 or more, more preferably 20 or more, even more preferably 30 or more, is 500 or less, preferably 400 or less, more preferably 350 or less, more preferably 300 or less, even more preferably 250 or less, and is preferably from 8 to 500, more preferably from 10 to 500, more preferably from 15 to 400, more preferably from 20 to 350, more preferably from 30 to 300, even more preferably from 30 to 250.

EXAMPLE

Analysis Method (i) Composition of Glycerides in Fat or Oil

About 10 mg of a fat or oil sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).

<GLC Analysis Conditions>
(Conditions)
Apparatus: Agilent 6890 Series (manufactured by Agilent Technologies)
Integrator: ChemStation B 02.01 SR2 (manufactured by Agilent Technologies)
Column: DB-1ht (manufactured by Agilent J&W)
Carrier gas: 1.0 mL He/min
Injector: Split (1:50), T=340° C.
Detector: FID, T=350° C.
Oven temperature: The temperature was raised from 80° C. at 10° C./min to 340° C., and kept for 15 minutes.

(ii) Composition of Constituent Fatty Acids in Fat or Oil

Fatty acid methyl esters were prepared in accordance with "Preparation method for fatty acid methyl ester (2.4.1.-1996)" described in "Standard Method for the Analysis of Fats, Oils and Related Materials" edited by Japan Oil Chemists' Society, and the resultant fat or oil samples were subjected to measurement in accordance with American Oil Chemists. Society Official Method Ce 1f-96 (GLC method).

<GLC Analysis Conditions>
Column: CP-SIL88 100 m×0.25 mm×0.2 μm (VARIAN)
Carrier gas: 1.0 mL He/min
Injector: Split (1:200), T=250° C.
Detector: FID, T=250° C.
Oven temperature: The temperature was kept at 174° C. for 50 minutes, raised to 220° C. at 5° C./min, and kept for 25 minutes.

(iii) Free Type Triterpene Alcohol and Free Type Phytosterol

Samples were prepared in accordance with J. Am. Oil Chem. Soc., 82 (6), 439 (2005), and were subjected to measurement by GLC. Specifically, the measurement was performed by the following method.

About 500 mg of a fat or oil sample were dissolved in about 5 mL of hexane, and the solution was charged into an SPE cartridge (Sep-Pak Silica, 5 g, GL Sciences Inc.). Washing was performed with about 40 mL of hexane/ether (95/5 in volume ratio), followed by elution with about 40 mL of ethanol/ether/hexane (50/25/25 in volume ratio), and an ethanol/ether/hexane-eluted fraction was separated. The solvent was distilled off from the fraction obtained, and the residue was charged into PTLC (Si 60, 20×20×0.1 cm, Merck KGaA). Development was performed with hexane/ether/acetic acid (90/10/2 in volume ratio) and chloroform/ether (95/5 in volume ratio) in the stated order, and then a free type triterpene alcohol fraction and a free type phytosterol fraction were separated. 0.5 mL of a trimethylsilylating agent ("Silylating agent TH," manufactured by Kanto Chemical Co., Inc.) was added to the free type triterpene alcohol fraction or free type phytosterol fraction thus-separated in a container. The container was sealed and heated at 70° C. for 30 minutes. 1.0 mL of water and 1.5 mL of hexane were added thereto, followed by shaking. The container was allowed to stand still, and then the upper layer was analyzed by gas-liquid chromatography (GLC), thereby measuring the amount of the free type triterpene alcohol and the amount of the free type phytosterol (mass %).

<GLC Analysis Conditions>
Column: DB-1ht 10.0 m×0.25 mm×0.10 μm (Agilent)
Carrier gas: 1.0 mL He/min
Injector: Split (1:80), T=340° C.
Detector: FID, T=350° C.
Oven temperature: The temperature was raised from 200° C. to 340° C. at 10° C./min, and kept for 10 minutes.

(iv) Total Triterpene Alcohols

Samples were prepared in accordance with J. Am. Oil Chem. Soc., (6), 439 (2005), and were subjected to measurement by GLC. Specifically, the measurement was performed by the following method.

About 5 g of a fat or oil sample and about 20 mL of a 2 N potassium hydroxide/ethanol solution were added into a conical flask, followed by heating at 80° C. for 60 minutes. After the mixture was allowed to be cooled to room temperature, an internal standard (cholesterol), 15 mL of water, and 10 mL of hexane were added, followed by shaking. After the mixture was allowed to stand still, the upper layer was separated and was concentrated. 0.5 mL of a trimethylsilylating agent ("Silylating agent TH," manufactured by Kanto Chemical Co., Inc.) was added to the concentrate in a container, and the container was sealed and heated at 70° C. for 30 minutes. 1.0 mL of water and 1.5 mL of hexane were added thereto, followed by shaking. The container was allowed to stand still, and then the upper layer was analyzed by gas-liquid chromatography (GLC), thereby measuring the amount of the total triterpene alcohols (mass %). The same GLC analysis conditions as those in (iii) were used.

(v) γ-Oryzanol

Samples were prepared in accordance with Lipids, 30 (3), 269 (1995), and the resultant samples were subjected to measurement by HPLC-UV. Specifically, the measurement was performed by the following method.

About 100 mg of a fat or oil sample was dissolved in ethyl acetate to obtain a solution (10 mL), and the solution was analyzed by an HPLC method.

<HPLC Analysis Conditions>
Column: Inertsil ODS-3, 4.6 mm×250 mm, 5 μm (GL Sciences Inc.)
Column temperature: 40° C.
Flow rate: 1.2 mL/min
Detection: UV 325 nm
Eluent: acetonitrile/butanol/acetic acid (volume ratio: 82/3/2)

(vi) Fatty Acid Ester Type Triterpene Alcohol

The amount of the free type triterpene alcohol and the amount of γ-oryzanol which was converted to the free type were subtracted from the amount of the total triterpene alcohols, thereby calculating the amount of fatty acid ester type triterpene alcohol which was converted to the free type. Conversion from the free type to the fatty acid ester type was performed, yielding the amount (mass %) of a fatty acid ester type triterpene alcohol. Note that, when the conversion from the free type to the fatty acid ester type was performed, calculation was made on the assumption that the linked fatty acid was oleic acid.

(Raw Material Fat or Oil)

(1) Fats or Oils A to C and E

There were used, as Fats or Oils A to C and E, fats or oils having each composition shown in Table 1 (Fat or Oil A: refined linseed oil (Summit Oil Mill Co., Ltd.), Fat or Oil B: rapeseed salad oil (Nisshin OilliO Group, Ltd.), Fat or Oil C: COCONARD MT (Kao Corporation), and Fat or Oil E: soy bean salad oil (Nisshin OilliO Group, Ltd.)).

Note that the contents of the free type and fatty acid ester type triterpene alcohols and the content of γ-oryzanol were 0% in each of Fats or Oils A to C and E.

(2) Fat or Oil D

Fat or Oil A (30 parts by mass), Fat or Oil B (50 parts by mass), and Fat or Oil C (20 parts by mass) were mixed and the mixture was stirred at 110° C. under reduced pressure, followed by deaeration and dehydration treatment. 0.2 part by mass of sodium methylate was added as a catalyst thereto to perform random transesterification reaction at 110° C. for 2 hours. The reaction product was subjected to acid treatment (a 10% citric acid aqueous solution) and water washing (ten times with distilled water), and was then brought into contact with activated clay (Galleon Earth V2R, Mizusawa Chemical Industry Co., Ltd.), thereby obtaining a decolored oil. Subsequently, the oil was brought into contact with water vapor to perform deodorization, thereby obtaining Fat or Oil D.

Table 1 shows the analysis values of Fats or Oils A to E.

(Free Type Triterpene Alcohol)

There was used, as the free type triterpene alcohol, a commercially available triterpene alcohol formulation ("ORYZA TRITERPENOID P" manufactured by Oryza Oil & Fat Chemical Co., Ltd. and containing a triterpene alcohol at 59%) or a preparation obtained by hydrolyzing a commercially available oryzanol (Wako Pure Chemical Industries, Ltd.) and purifying the reaction product by silica-gel chromatography. The composition of the commercially available triterpene alcohol formulation was as follows: campesterol: 21%, β-sitosterol: 15%, stigmasterol: 3%, cycloartenol: 22%, 24-methylenecycloartanol: 37%. The composition of the preparation obtained from the commercially available oryzanol was as follows: cycloartenol: 40%, 24-methylenecycloartanol: 60%.

(Free Type Phytosterol)

A commercially available phytosterol formulation (ADM) was used as the free type phytosterol (4-desmethylsterol). The composition of this formulation was as follows: brassicasterol: 5%, campesterol: 25%, β-sitosterol: 46%, stigmasterol: 21%.

Examples 1 to 24 and Comparative Examples 1 to 9

Preparation of Fat or Oil Composition

Fats or Oils A, B, D, and E were mixed at each ratio shown in Table 2 and were additionally blended with the commercially available triterpene alcohol formulation as the free type triterpene alcohol. Each mixture was mixed and dissolved by using a stirrer while its temperature was kept at 50° C. until the mixture turned entirely clear, thereby preparing each fat or oil composition. Table 2 shows the content of oleic acid (C18:1), the content of linoleic acid (C18:2), the content of α-linolenic acid (C18:3), and the total content of saturated fatty acids having 6 to 12 carbon atoms (C6:0+C8:0+C10:0+C12:0) in the constituent fatty acids of the fat or oil in each fat or oil composition, and the content of the free type triterpene alcohol in each fat or oil composition.

Example 25 and Comparative Example 10

Preparation of Fat or Oil Composition

Fats or Oils A and B were mixed at each ratio shown in Table 3, and were additionally blended with the preparation obtained from oryzanol as the free type triterpene alcohol, or with the commercially available phytosterol formulation. Each mixture was mixed and dissolved by using a stirrer while its temperature was kept at 50° C. until the mixture turned entirely clear, thereby preparing each fat or oil composition. Table 3 shows the content of oleic acid (C18:1), the content of linoleic acid (C18:2), the content of α-linolenic acid (C18:3), and the total content of saturated fatty acids having 6 to 12 carbon atoms (C6:0+C8:0+C10:0+C12:0) in

TABLE 1

| | Composition of fatty acids (mass %) | | | | | | | | |
|---|---|---|---|---|---|---|---|---|---|
| | C6:0 | C8:0 | C10:0 | C12:0 | C14:0 | C16:0 | C18:0 | C18:1 | C18:2 |
| Fat or Oil A | 0.0 | 0.0 | 0.0 | 0.0 | 0.0 | 4.5 | 2.5 | 16.5 | 16.3 |
| Fat or Oil B | 0.0 | 0.0 | 0.0 | 0.0 | 0.0 | 4.1 | 2.0 | 62.4 | 20.4 |
| Fat or Oil C | 0.0 | 81.6 | 17.4 | 0.4 | 0.0 | 0.0 | 0.0 | 0.0 | 0.0 |
| Fat or Oil D | 0.0 | 16.3 | 3.5 | 0.1 | 0.0 | 3.4 | 1.8 | 36.1 | 15.1 |
| Fat or Oil E | 0.0 | 0.0 | 0.0 | 0.0 | 0.0 | 10.1 | 4.1 | 24.5 | 52.3 |

| | Composition of fatty acids (mass %) | | | | | Composition of glycerides (mass %) | | |
|---|---|---|---|---|---|---|---|---|
| | C18:3 | C20:0 | C20:1 | C22:0 | C22:1 | MAG | DAG | TAG |
| Fat or Oil A | 58.7 | 0.0 | 1.1 | 0.0 | 0.0 | 0.0 | 2.6 | 97.4 |
| Fat or Oil B | 8.4 | 0.6 | 1.3 | 0.4 | 0.1 | 0.0 | 1.5 | 98.5 |
| Fat or Oil C | 0.0 | 0.0 | 0.0 | 0.0 | 0.0 | 0.0 | 2.5 | 97.5 |
| Fat or Oil D | 21.8 | 0.3 | 0.9 | 0.2 | 0.0 | 0.0 | 3.5 | 96.5 |
| Fat or Oil E | 6.9 | 0.3 | 0.3 | 0.4 | 0.0 | 0.0 | 2.4 | 97.6 |

MAG: Monoacylglycerol
DAG: Diacylglycerol
TAG: Triacylglycerol the constituent fatty acids of the fat or oil in each fat or oil composition, and the content of the free type triterpene alcohol and the content of the free type phytosterol in each fat or oil composition.

(Tempura Cooking)

Tempura was cooked with each of the fat or oil compositions by the following method.
Oil amount: 600 g (wok)
Oil temperature: 180° C., heating with a gas stove burner (medium heat)
Materials to be Fried:

| | |
|---|---|
| Prawn (black tiger prawns) | 8 prawns |
| Lotus root (slices) | 8 slices |
| Pumpkin (slices) | 8 slices |
| Bell peppers (each cut into halves) | 8 peppers |
| Shishito peppers (whole) | 8 peppers |
| *f. viridis* (Makino) Makino (whole) | 8 pieces |
| Eggplants (each cut into halves) | 8 eggplants |

Batter:

| | |
|---|---|
| Flour | 100 g |
| Egg | 50 g |
| Water | 150 g |

(Evaluation of Taste and Flavor)

Nine panelists evaluated odor smelled at the time of tempura cooking and the taste and flavor of tempura in accordance with the following evaluation criteria, and an average value of scores was calculated as a score of the tempura. Tables 2 and 3 show the results.

(Rich Body)
4: Tempura has rich body.
3: Tempura slightly has rich body.
2: Tempura slightly lacks rich body.
1: Tempura lacks rich body.

(Oily Feeling)
4: Oily feeling is not sensed and Tempura is light.
3: Oily feeling is barely sensed but Tempura is light.
2: Oily feeling is slightly sensed and Tempura is slightly heavy.
1. Oily feeling is sensed and Tempura is heavy.

(Crispiness)
4: Batter is moderately hard, is not sticky, and is crisp.
3: Batter is moderately hard and is not sticky.
2: Batter is slightly hard and barely sticky.
1: Batter is hard and sticky.

(Degradation Odor at the Time of Cooking)
4: No degradation odor is sensed.
3: Degradation odor is hardly sensed.
2: Degradation odor is slightly sensed.
1: Strong degradation odor is sensed.

(Evaluation of Smoke Generation)

The appearance of smoke generation at the time of tempura cooking with a fat or oil composition was evaluated in accordance with the following evaluation criteria, and a score was given to the fat or oil composition. Tables 2 and 3 show the results.

(Smoke Generation)
4. No smoke generation occurs.
3. Smoke generation hardly occurs.
2. Smoke generation barely occurs.
1. Heavy smoke generation occurs.

TABLE 2

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Fat or Oil A | 10 | 10 | 10 | 10 | 10 | 20 | 20 | 20 | 30 | 30 | 30 | 30 | 30 | 50 | 60 | 60 |
| Fat or Oil B | 90 | 90 | 90 | 90 | 90 | 80 | 80 | 80 | 70 | 70 | 70 | 70 | 70 | 50 | 40 | 40 |
| Fat or Oil D | 0 | 0 | 0 | 0 | 0 | 0 | 0 | 0 | 0 | 0 | 0 | 0 | 0 | 0 | 0 | 0 |
| Fat or Oil E | 0 | 0 | 0 | 0 | 0 | 0 | 0 | 0 | 0 | 0 | 0 | 0 | 0 | 0 | 0 | 0 |
| Ratio (mass %) in fat or oil (A) | | | | | | | | | | | | | | | | |
| C18:1 | 57.8 | 57.8 | 57.8 | 57.8 | 57.8 | 53.2 | 53.2 | 53.2 | 48.6 | 48.6 | 48.6 | 48.6 | 48.6 | 39.4 | 34.9 | 34.9 |
| C18:2 | 20.0 | 20.0 | 20.0 | 20.0 | 20.0 | 19.6 | 19.6 | 19.6 | 19.2 | 19.2 | 19.2 | 19.2 | 19.2 | 18.3 | 17.9 | 17.9 |
| C18:3 | 13.4 | 13.4 | 13.4 | 13.4 | 13.4 | 18.4 | 18.4 | 18.4 | 23.5 | 23.5 | 23.5 | 23.5 | 23.5 | 33.5 | 38.5 | 38.5 |
| C6:0 + C8:0 + C10:0 + C12:0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| (C18:3)/(C18:1) | 0.23 | 0.23 | 0.23 | 0.23 | 0.23 | 0.35 | 0.35 | 0.35 | 0.48 | 0.48 | 0.48 | 0.48 | 0.48 | 0.85 | 1.11 | 1.11 |
| Free type triterpene alcohol (B) (mass %) | 0.05 | 0.15 | 0.50 | 1.00 | 1.50 | 0.05 | 0.15 | 0.50 | 0.05 | 0.10 | 0.50 | 0.75 | 1.25 | 0.50 | 0.10 | 0.50 |
| (C18:3)/(B) | 267.7 | 89.1 | 26.6 | 13.2 | 8.7 | 368.3 | 122.5 | 36.5 | 468.8 | 234.2 | 46.5 | 30.9 | 18.4 | 66.5 | 384.8 | 76.4 |
| Evaluation of tempura cooking | | | | | | | | | | | | | | | | |
| Rich body | 3 | 3 | 3 | 3 | 4 | 4 | 4 | 4 | 4 | 4 | 4 | 4 | 4 | 3 | 3 | 3 |
| Oily feeling | 4 | 4 | 4 | 4 | 4 | 4 | 4 | 4 | 3 | 4 | 4 | 4 | 3 | 4 | 2 | 3 |
| Crispiness | 2 | 2 | 2 | 2 | 2 | 4 | 4 | 4 | 4 | 4 | 4 | 4 | 4 | 4 | 2 | 2 |
| Degradation odor at the time of cooking | 3 | 4 | 4 | 4 | 4 | 3 | 4 | 4 | 3 | 4 | 4 | 4 | 4 | 4 | 4 | 4 |
| Smoke generation | 4 | 4 | 4 | 4 | 4 | 4 | 4 | 4 | 4 | 4 | 4 | 4 | 4 | 4 | 4 | 4 |

TABLE 2-continued

|  | Example | | | | | | | | Comparative Example | | | | | | | | |
| --- | --- | --- | --- | --- | --- | --- | --- | --- | --- | --- | --- | --- | --- | --- | --- | --- | --- |
|  | 17 | 18 | 19 | 20 | 21 | 22 | 23 | 24 | 1 | 2 | 3 | 4 | 5 | 6 | 7 | 8 | 9 |
| Fat or Oil A | 60 | 0 | 20 | 20 | 30 | 30 | 30 | 30 | 0 | 10 | 10 | 30 | 30 | 60 | 60 | 90 | 90 |
| Fat or Oil B | 40 | 0 | 0 | 40 | 0 | 0 | 0 | 35 | 100 | 90 | 90 | 70 | 0 | 40 | 40 | 10 | 10 |
| Fat or Oil D | 0 | 100 | 0 | 0 | 0 | 0 | 0 | 0 | 0 | 0 | 0 | 0 | 0 | 0 | 0 | 0 | 0 |
| Fat or Oil E | 0 | 0 | 80 | 40 | 70 | 70 | 70 | 35 | 0 | 0 | 0 | 0 | 70 | 0 | 0 | 0 | 0 |
| Ratio (mass %) in fat or oil (A) | | | | | | | | | | | | | | | | | |
| C18:1 | 34.9 | 36.1 | 22.9 | 38.1 | 22.1 | 22.1 | 22.1 | 35.4 | 62.4 | 57.8 | 57.8 | 48.6 | 22.1 | 34.9 | 34.9 | 21.1 | 21.1 |
| C18:2 | 17.9 | 15.1 | 45.1 | 32.4 | 41.5 | 41.5 | 41.5 | 30.3 | 20.4 | 20.0 | 20.0 | 19.2 | 41.5 | 17.9 | 17.9 | 16.7 | 16.7 |
| C18:3 | 38.5 | 21.8 | 17.2 | 17.8 | 22.4 | 22.4 | 22.4 | 22.9 | 8.4 | 13.4 | 13.4 | 23.5 | 22.4 | 38.5 | 38.5 | 53.6 | 53.6 |
| C6:0 + C8:0 + C10:0 + C12:0 | 0.0 | 19.9 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| (C18:3)/(C18:1) | 1.11 | 0.60 | 0.75 | 0.47 | 1.01 | 1.01 | 1.01 | 0.65 | 0.13 | 0.23 | 0.23 | 0.48 | 1.01 | 1.11 | 1.11 | 2.54 | 2.54 |
| Free type triterpene alcohol (B) (mass %) | 1.50 | 0.50 | 0.50 | 0.50 | 0.05 | 0.50 | 1.00 | 0.50 | 0.05 | 0.00 | 2.30 | 0.00 | 0.00 | 0.00 | 2.30 | 0.05 | 1.50 |
| (C18:3)/(B) | 25.0 | 43.2 | 34.2 | 35.4 | 447.7 | 44.4 | 22.0 | 45.5 | 167.2 | — | 5.6 | — | — | — | 16.1 | 1071.9 | 34.9 |
| Evaluation of tempura cooking | | | | | | | | | | | | | | | | | |
| Rich body | 3 | 3 | 4 | 4 | 4 | 4 | 4 | 4 | 1 | 3 | 1 | 4 | 4 | 1 | 2 | 1 | 1 |
| Oily feeling | 4 | 4 | 4 | 4 | 3 | 4 | 3 | 4 | 4 | 2 | 3 | 2 | 1 | 1 | 1 | 1 | 2 |
| Crispiness | 2 | 4 | 4 | 4 | 4 | 4 | 4 | 4 | 2 | 2 | 2 | 4 | 4 | 3 | 3 | 1 | 1 |
| Degradation odor at the time of cooking | 4 | 4 | 4 | 4 | 3 | 4 | 4 | 4 | 3 | 1 | 3 | 1 | 1 | 1 | 3 | 1 | 1 |
| Smoke generation | 4 | 2 | 4 | 4 | 4 | 4 | 4 | 4 | 4 | 4 | 4 | 4 | 4 | 4 | 4 | 4 | 4 |

TABLE 3

|  | Example 25 | Comparative Example 10 |
| --- | --- | --- |
| Fat or Oil A | 30 | 30 |
| Fat or Oil B | 70 | 70 |
| Ratio (mass %) in fat or oil (A) | | |
| C18:1 | 48.6 | 48.6 |
| C18:2 | 19.2 | 19.2 |
| C18:3 | 23.5 | 23.5 |
| C6:0 + C8:0 + C10:0 + C12:0 | 0.0 | 0.0 |
| (C18:3)/(C18:1) | 0.48 | 0.48 |
| Free type triterpene alcohol (B) (mass %) | 0.15 | 0.00 |
| (C18:3)/(B) | 156.2 | — |
| Free type phytosterol (mass %) | 0.00 | 0.15 |
| Evaluation of tempura cooking | | |
| Rich body | 4 | 4 |
| Oily feeling | 4 | 1 |
| Crispiness | 4 | 4 |
| Degradation odor at the time of cooking | 4 | 1 |
| Smoke generation | 4 | 4 |

As evident from the results shown in Table 2 and Table 3, it confirmed that degradation odor at the time of cooking was suppressed by the fat or oil compositions including the free type triterpene alcohol in a specific amount. Further, in regard to each deep-fried food cooked by using the fat or oil compositions according to the present invention, it found that its batter provided good texture of food and that the deep-fried food did not have oily heavy taste and flavor, had rich body, and had good taste and flavor. When the fat or oil compositions of Examples 1 to 17 and 19 to 25 were used at the time of cooking, smoke generation did not occur.

When a deep-fried food was cooked by using rapeseed salad oil (Comparative Example 1) in which the content of α-linolenic acid in the constituent fatty acids of the fat or oil was less than 10%, the deep-fried food had less rich body. When a deep-fried food was cooked by using each fat or oil (Comparative Examples 2 and 4 to 6) in which the content of the free type triterpene alcohol was smaller, degradation odor at the time of the cooking was not suppressed. When a deep-fried food was cooked by using each fat or oil (Comparative Examples 3 and 7) in which the content of the free type triterpene alcohol was larger, degradation odor was suppressed at the time of the cooking, but the deep-fried food had problems in regard to rich body and oily feeling, and hence the each fat or oil was not preferred. Further, when a deep-fried food was cooked by using each fat or oil (Comparative Examples 8 and 9) in which the content of α-linolenic acid in the constituent fatty acids of the fat or oil was more than 50%, degradation odor at the time of the cooking was not sufficiently suppressed, and the deep-fried food did not provide crispiness, even though the free type triterpene alcohol was blended therein.

The invention claimed is:

1. A fat or oil composition, comprising components (A) and (B):
   (A) a fat or oil whose constituent fatty acids comprise from 10 to 50 mass % of α-linolenic acid; and
   (B) 0.05 to 1.8 mass % of a free type triterpene alcohol,
   wherein a content of a free fatty acid or salt thereof, if present, is from 0 to 1 mass % in the fat or oil,
   wherein the fat or oil is obtained by a process comprising refining the fat or oil, and
   wherein the fat or oil as the component (A) comprises from 0.1 to 9 mass % diacylglycerol.

2. The fat or oil composition according to claim 1, wherein a content of α-linolenic acid in the constituent fatty acids of the fat or oil as the component (A) is from 18 to 25 mass %.

3. The fat or oil composition according to claim 1, wherein a content of the free type triterpene alcohol as the component (B) is from 0.05 to 1.2 mass %.

4. The fat or oil composition according to claim 1, wherein a content of the free type triterpene alcohol as the component (B) is from 0.1 to 1 mass %.

5. The fat or oil composition according to claim 1, wherein the fat or oil as the component (A) comprises from 78 to 99.5 mass % of a triacylglycerol.

6. The fat or oil composition according to claim 1, comprising from 95 to 99.95 mass % of the fat or oil as the component (A).

7. The fat or oil composition according to claim 1, wherein a mass ratio between a content, in the fat or oil composition, of α-linolenic acid (C18:3) in the constituent fatty acids of the fat or oil as the component (A) and a content, in the fat or oil composition, of the free type triterpene alcohol as the component (B), [(C18:3)/(B)], is from 8 to 500.

8. The fat or oil composition according to claim 1, wherein a mass ratio between a content, in the fat or oil composition, of α-linolenic acid (C18:3) in the constituent fatty acids of the fat or oil as the component (A) and a content, in the fat or oil composition, of the free type triterpene alcohol as the component (B), [(C18:3)/(B)], is from 15 to 400.

9. The fat or oil composition according to claim 1, wherein a mass ratio between a content, in the fat or oil composition, of α-linolenic acid (C18:3) in the constituent fatty acids of the fat or oil as the component (A) and a content, in the fat or oil composition, of the free type triterpene alcohol as the component (B), [(C18:3)/(B)], is from 20 to 350.

10. The fat or oil composition according to claim 1, wherein a mass ratio between a content, in the fat or oil composition, of α-linolenic acid (C18:3) in the constituent fatty acids of the fat or oil as the component (A) and a content, in the fat or oil composition, of the free type triterpene alcohol as the component (B), [(C18:3)/(B)], is from 30 to 250.

11. The fat or oil composition according to claim 1, wherein the free type triterpene alcohol as the component (B) comprises one or two or more selected from cycloartenol, 24-methylenecycloartanol, and cyclobranol.

12. The fat or oil composition according to claim 1, wherein a content of cycloartenol in the free type triterpene alcohol as the component (B) is from 15 to 100 mass %.

13. The fat or oil composition according to claim 1, wherein a content of a fatty acid ester type triterpene alcohol in the fat or oil composition is 1.4 mass % or less.

14. The fat or oil composition according to claim 1, wherein a content of a fatty acid ester type triterpene alcohol in the fat or oil composition is from 0.01 to 0.5 mass %.

15. The fat or oil composition according to claim 1, wherein a content of a ferulic acid ester type triterpene alcohol in the fat or oil composition is 0.7 mass % or less.

16. The fat or oil composition according to claim 1, wherein a content of a ferulic acid ester type triterpene alcohol in the fat or oil composition is from 0.0002 to 0.15 mass %.

17. The fat or oil composition according to claim 1, wherein unsaturated fatty acids are comprised in a content of from 60 to 100 mass % relative to the constituent fatty acids of the fat or oil as the component (A) other than α-linolenic acid.

18. The fat or oil composition according to claim 1, wherein a content mass ratio of α-linolenic acid (C18:3) to oleic acid (C18:1), [(C18:3)/(C18:1)], in the constituent fatty acids of the fat or oil as the component (A) is from 0.1 to 2.

19. The fat or oil composition of claim 1, obtained by a process comprising adding the free type triterpene alcohol (B) to the fat or oil (A), thereby obtaining a higher content of the free type triterpene alcohol (B) than in the fat or oil (A) alone.

20. The fat or oil composition of claim 1, wherein a content of the fat or oil as component (A) is from 97 to 99.95%.

21. The fat or oil composition of claim 1, wherein the fat or oil as the component (A) comprises from 90 to 99.5 mass % triacylglycerol.

* * * * *